United States Patent
Pimmel

(10) Patent No.: US 11,479,279 B2
(45) Date of Patent: Oct. 25, 2022

(54) SYSTEM AND METHOD FOR PROTECTING A COMMUNICATION BETWEEN A BALISE AND A GUIDED VEHICLE FROM CROSS-TALK

(71) Applicant: SIEMENS MOBILITY S.A.S., Chatillon (FR)

(72) Inventor: Pierre Pimmel, Antony (FR)

(73) Assignee: Siemens S.A.S, Saint-Denis (FR)

( * ) Notice: Subject to any disclaimer, the term of this patent is extended or adjusted under 35 U.S.C. 154(b) by 341 days.

(21) Appl. No.: 16/763,025

(22) PCT Filed: Oct. 4, 2018

(86) PCT No.: PCT/EP2018/077013
§ 371 (c)(1),
(2) Date: May 11, 2020

(87) PCT Pub. No.: WO2019/091673
PCT Pub. Date: May 16, 2019

(65) Prior Publication Data
US 2020/0385035 A1 Dec. 10, 2020

(30) Foreign Application Priority Data
Nov. 9, 2017 (EP) .................................... 17290146

(51) Int. Cl.
*B61L 15/00* (2006.01)
*H04B 7/08* (2006.01)
(Continued)

(52) U.S. Cl.
CPC ............. *B61L 15/0027* (2013.01); *B61L 3/12* (2013.01); *H04B 1/10* (2013.01); *H04B 7/08* (2013.01);
(Continued)

(58) Field of Classification Search
CPC ...... B61L 15/0027; B61L 27/60; B61L 27/70; H04B 1/10; H04B 7/08
See application file for complete search history.

(56) References Cited

U.S. PATENT DOCUMENTS

2013/0336367 A1* 12/2013 Soderi .................. B61L 25/025
375/144
2015/0198712 A1* 7/2015 Soderi ..................... G01S 13/75
342/145

FOREIGN PATENT DOCUMENTS

DE 102013220868 A1 4/2015
GB 2027244 A 2/1980
(Continued)

OTHER PUBLICATIONS

"ERTMS/ETCS FFFIS for Eurobalise", Feb. 24, 2012 (Feb. 24, 2012) pp. 1-157, XP055112059, Retrieved from the Internet: URL:http://www.era.europa.eu/Document-Register/Documents/Set-2-Index009-SUBSET-036v300.pdf [retrieved on Apr. 3, 2014] pp. 27-29, paragraph 4.2.5, pp. 65, paragraph 5.2.2.7.

*Primary Examiner* — David S Huang
(74) *Attorney, Agent, or Firm* — Laurence A. Greenberg; Werner H. Stemer; Ralph E. Locher

(57) ABSTRACT

An on-board device is configured for reading a telegram of a balise installed at a point along a route followed by a guided vehicle in which the on-board device is to be installed. The on-board device includes a receiver having an antenna for picking up the telegram transmitted by the balise and delivering a reception signal to a processing unit. The processing unit is configured for processing the reception signal in order to read the telegram sent by the balise. A test component is configured for adding a test signal to the reception signal before its processing by the processing unit. The test signal is configured to act as a noise for limiting a sensitivity of the receiver, making it therefore impossible to (Continued)

read a cross-talk signal. A method for protecting the on-board device from cross-talk is also provided.

13 Claims, 2 Drawing Sheets

(51) Int. Cl.
  *B61L 3/12* (2006.01)
  *H04B 1/10* (2006.01)
  *B61L 27/70* (2022.01)

(52) U.S. Cl.
  CPC ......... *B61L 27/70* (2022.01); *B61L 2003/123* (2013.01)

(56) References Cited

FOREIGN PATENT DOCUMENTS

WO  2015197286 A1  12/2015
WO  2018046217 A1  3/2018

\* cited by examiner

SYSTEM AND METHOD FOR PROTECTING A COMMUNICATION BETWEEN A BALISE AND A GUIDED VEHICLE FROM CROSS-TALK

BACKGROUND OF THE INVENTION

Field of the Invention

The present invention concerns a system and a method for protecting a communication between a balise and a guided vehicle on-board device from cross-talk, wherein balises are installed at points along a route followed by the guided vehicle.

The present invention is related to the problematic of crosstalk that may occur when an on-board device of a guided vehicle receives a signal (said signal being typically a "telegram") from a balise mounted on a track of a railway network that is followed by the guided vehicle. Cross-talk refers to an undesired effect in the on-board device created by the reception by said on-board device of an additional signal (also called hereafter "cross-talk signal") apart from the signal received from the balise it is reading, i.e. said telegram. Typically, there is cross-talk when a telegram is read from a balise that should not be read, like a balise on another track. The cross-talk signal might be received by an on-board device while no signal is expected, leading for instance to an incorrect localization of the guided vehicle.

From a general point of view the present invention deals with balises (also called beacons) installed on a route or track followed by the guided vehicle and which are configured for exchanging data with the guided vehicle by means of an electromagnetic signal when the guided vehicle passes near, for example above/over, the balise. In particular, said balise is an Eurobalise, i.e. a balise which complies with the European Train Control System, and is installed between rails of a railway followed by the guided vehicle. "Guided vehicle" according to the present invention refers to public transport means such as buses, trolleybuses, streetcars, subways, trains or train units, etc., as well as load transporting means such as, for example, overhead traveling cranes, for which safety is a very important factor and which are guided along a route or railway for instance by at least one rail, in particular by two rails between which balises are placed.

In order to solve this problematic of cross-talk, it has been proposed to measure the amplitude of the signal received by the on-board device, and to cut the signal if it becomes under a given threshold. Unfortunately, such a solution requires to regularly check the gain of the on-board device in order to ensure that it did not change, or to use an on-board device comprising redundant independent receiving units for the reading of balise signals. Additionally, this solution requires the threshold being safety guaranteed, which is a complex task.

SUMMARY OF THE INVENTION

An objective of the present invention is to propose a new system and method for protecting from cross-talk a communication between a balise and a guided vehicle on-board device, which are simple, efficient, and whose failure might be easily and cost efficiently detected.

For achieving said objective, the present invention proposes to incorporate into a reception signal outputted by an antenna of a receiver of the on-board device a test signal acting as a noise to limit the sensitivity of the on-board device as recited in the preambles of the independent claims. Other advantages of the invention are presented in the dependent claims.

The present invention proposes notably an on-board device for reading a telegram of a balise installed at a point along a route followed by a guided vehicle in which said on-board device is designed to be installed, said on-board device comprising:

optionally an emitter configured for remotely powering the balise, in particular by means of radiant energy. Said emitter comprising for example an antenna comprising an emitting loop for radiating energy, in particular radio frequency energy, the balise being then powered by said radiated energy and able to transmit, in return, an electromagnetic signal that is the so-called telegram;

a receiver comprising an antenna, the receiver being configured for outputting a reception signal in function of an electromagnetic radiation picked up or received by the antenna. Typically, the antenna of the receiver is configured for picking up the telegram transmitted by the balise, for instance in response to its powering by the emitter, and for delivering the reception signal to a processing unit. In this case, the electromagnetic radiation picked up by the receiver antenna comprises the electromagnetic signal sent by the balise, i.e. said telegram. In particular, the telegram is produced by a transmitting loop of the balise and transmitted by the latter to the receiver through an air gap separating the receiver antenna from the balise transmitting loop. The reception signal results from current induced by the electromagnetic radiation in each receiving loop of the antenna of the receiver, said current providing a measure of the amplitude of the electromagnetic radiation received by the antenna. When said electromagnetic radiation comprises only the electromagnetic signal emitted by the balise, then the amplitude of the electromagnetic signal is typically a function of the position of the receiver antenna compared to the position of the balise;

a processing unit capable of processing the reception signal outputted by the receiver antenna notably in order to read said telegram, i.e. determine information comprised within the electromagnetic radiation picked up by the antenna;

the on-board device according to the invention being characterized in that it comprises a test component configured for adding to or incorporating into the reception signal and before its processing by the processing unit a test signal, preferentially a Direct Sequence Spread Spectrum (DSSS) signal, said test signal being configured for acting as a noise for limiting a sensitivity of the receiver. Preferentially, said test component comprises a test antenna configured for transmitting the test signal through the antenna of the receiver of the on-board device. The adding of the test signal to the reception signal makes it impossible to demodulate a cross-talk signal that would be received by the receiver because said test signal is configured for being spread into the whole reception bandwidth of the receiver, and therefore protects the on-board device from any cross-talk undesired effects. Preferentially, the test signal amplitude is limited to a predefined value in order to limit a signal to noise ratio for the reception signal. The test signal according to the invention typically acts as a white noise inside the receiver bandwidth as it is spread in said bandwidth.

The present invention concerns also a method for protecting from cross-talk an on-board device configured for reading telegrams of balises installed at points along a route followed by a guided vehicle in which said on-board device is installed, the method comprising the following steps:
- optionally remotely powering the balise by means of an emitter of the on-board device, or sending an initialization signal to the balise;
- optionally sending an electromagnetic signal (the so-called telegram) to a receiver of the on-board device, wherein said electromagnetic signal is produced by the balise, for instance in response to its powering by the emitter, or in response to a reception by the balise of the initialization signal sent by the emitter;
- picking up an electromagnetic radiation by means of an antenna of the receiver of the on-board device and outputting a reception signal in function of the picked up electromagnetic radiation to a processing unit, wherein said electromagnetic radiation may comprise the electromagnetic signal emitted by the balise;
- receiving and processing the reception signal by means of the processing unit in order to determine information comprised within said electromagnetic radiation;

the method according to the invention being characterized in that it comprises
- adding to or incorporating into the reception signal and before its processing by the processing unit a test signal, preferentially said Direct Sequence Spread Spectrum (DSSS) signal, said test signal acting as a noise for limiting a sensitivity of the receiver, wherein said test signal is configured for spreading over the whole reception bandwidth of the receiver. Preferentially, the test signal is incorporated into the reception signal by emitting a test electromagnetic signal by a test antenna of a test component of the on-board device, said test electromagnetic signal being configured for being directly received or picked up by the receiver antenna.

According to the present invention, the test signal is a known signal whose characteristics are known and stored within the on-board device in order to enable the latter to extract the test signal from the reception signal for test and verification purposes.

Further aspects of the present invention will be better understood through the following drawings, wherein like numerals are used for like and corresponding parts.

DETAILED DESCRIPTION OF THE INVENTION

Figure 1:
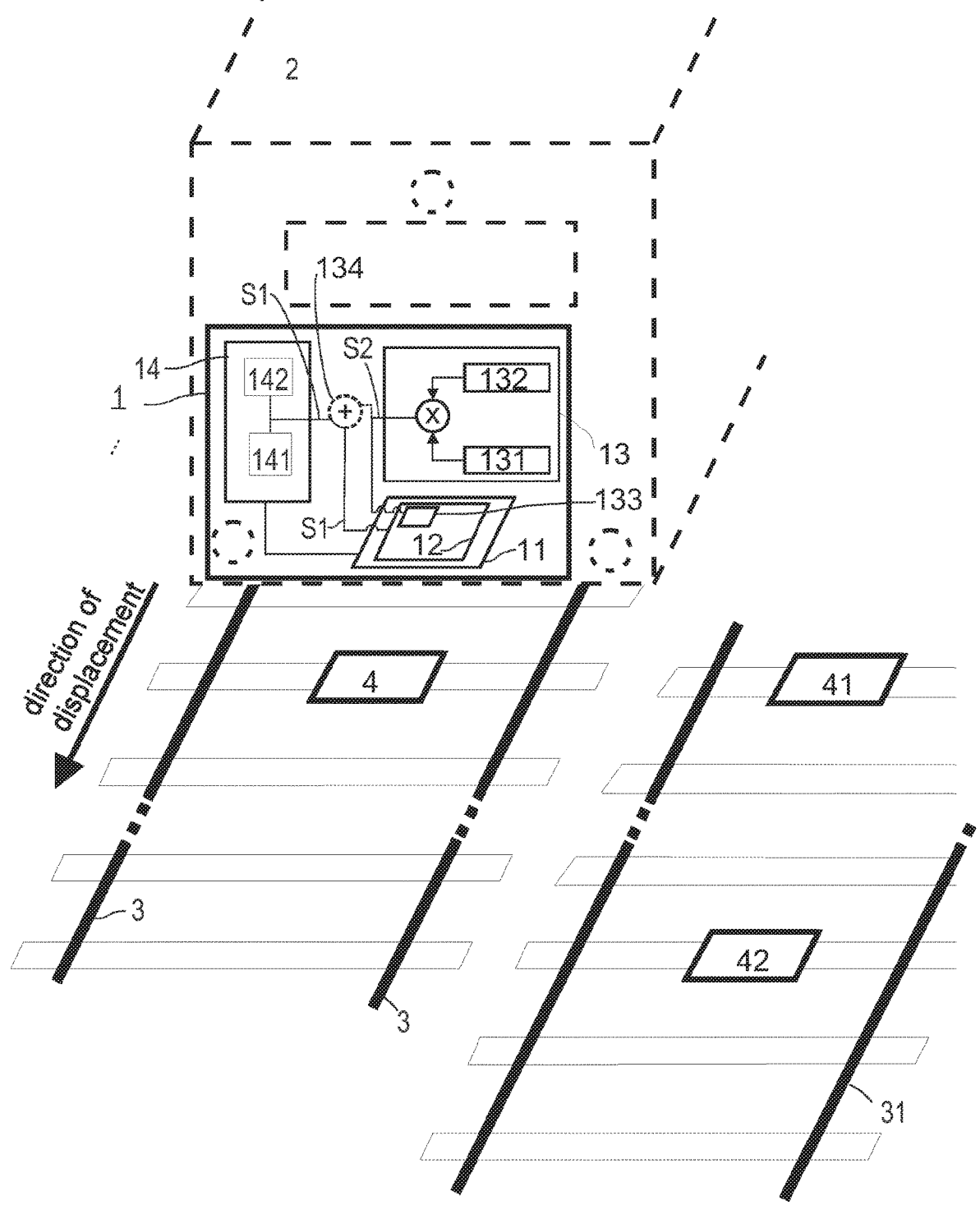
FIG. 1 schematic representation of a preferred embodiment of a system according to the invention mounted on board a guided vehicle.

FIG. 1 shows an on-board device 1 according to the invention mounted on-board a guided vehicle 2 which is configured to follow a route defined by a pair of rails 3. A balise 4 is installed on the route or rail track followed by the guided vehicle 2, for example between the rails 3. The rail track may comprise several balises 4 forming a system of balises 4, each balise being configured to exchange information with the guided vehicle 2 when the latter passes at proximity, for instance above/over, said balise 4. The balise 4 and the onboard device 1 exchange information by means of electromagnetic signals transmitted from the balise 4, respectively onboard device 1, to the on-board device 1, respectively balise 4. During communication between the balise 4 and the on-board device 1 undesired cross-talk signal might be received from another balise 41 installed on an adjacent route defined by another pair of rails 31 in proximity of the balise 4 or any other component which might generate an electromagnetic field from a signal sent by the on-board device 1 and capable of interfering with the signal received by the on-board device 1 from the balise 4. For instance, a cross-talk signal emitted by another balise 42 installed on said adjacent route might be received by the on-board device 1 while no balise is installed on the route followed by said guided vehicle 2.

The on-board device 1 according to the invention comprises preferentially an emitter 11, a receiver 12, a processing unit 14 and a test component 13. The emitter 11 is for instance configured for remotely powering the balise 4 by means of radiant energy, and/or for transmitting an initialization signal to the balise, and/or for storing data within the balise 4. The balise is configured for sending an electromagnetic signal, i.e. the so-called telegram, comprising encoded information to the receiver 12 of the on-board device. The balise might be a self-powered balise. The balise may send an electromagnetic signal to the receiver when the latter is detected, or may send said electromagnetic signal to the receiver in response to its powering by the emitter 11. An antenna of the receiver 12 is configured for receiving the electromagnetic signal of the balise and outputting, from its interaction with said electromagnetic signal, a reception signal S1 that is sent to the processing unit 14 in order to determine the information provided by the balise 4. Said reception signal S1 is the signal outputted by the antenna of the receiver 12 when said antenna induces a current from its interaction with electromagnetic radiations. If the electromagnetic radiation comes from a balise installed on the route of the guided vehicle, then the reception signal S1 comprises information transmitted by the balise for said guided vehicle. If said electromagnetic radiation comes from another object which is either an object located on the track of the guided vehicle but different from a balise while capable of emitting electromagnetic radiation or a balise located on an adjacent route, like balise 42, then said reception signal may comprise information or data that might be wrongly interpreted by the processing unit 14, leading for instance to a wrong positioning of the guided vehicle with respect to the railway network.

Balises 4 typically use a Frequency-Shift Keying (FSK) technique for transmitting the telegram to the receiver 12. According to said FSK technique, digital information provided by the balise to the receiver 12 is transmitted by means of said telegram through discrete frequencies that encode information: typically in case of binary FSK, a pair of discrete frequencies (see for instance the frequencies F1 and F2 in FIG. 3) is used for encoding binary information in the form of a succession of 0 and 1 (e.g. one frequency encoding "0" and the other frequency encoding "1"). This is a known technique which does not need further detailed explanations. The reception signal S1 outputted by the antenna of the receiver 12 and resulting from the reception of the telegram is a function of said discrete frequencies, said reception signal S1 being then processed by a FSK demodulator 141 of the processing unit 14 in order to determine the information encoded in the telegram.

The on-board device 1 according to the invention further comprises a test component 13 configured for adding to or incorporating into the reception signal S1 which is outputted by the antenna of the receiver 12 in function of the electromagnetic radiation received by the receiver antenna, a test signal S2, for instance added in series 134 to an output of the antenna of the receiver 12 or directly transmitted in the form of a test electromagnetic signal to the receiver antenna so that the reception signal S1 induced in the receiver antenna by electromagnetic radiation comprises said test signal S2. According to the present invention, the test signal S2 is the signal outputted by the test component 13 and incorporated or added to the reception signal outputted by the antenna of the receiver. According to the present invention, the wording "test signal" might refer to different kind of physical signals depending on the stage at which said wording is used: for instance it can refer to output current flowing through an output wire of the test component, and/or to said electromagnetic test signal radiated by the test antenna 133 of the test component 13, said electromagnetic test signal being created for instance by said output current flowing through the output wire of the test component, and/or to the part of the reception signal either coming from current induced by the electromagnetic test signal or from output current directly added to an output of the receiver antenna by the test component. Therefore, the physical nature of the test signal can change depending on the context wherein it is cited. Nevertheless, in each case, the purpose of the test signal S2 is the same, i.e. it is a signal configured for acting as a noise in the whole reception bandwidth of the receiver 12 so as to limit the sensitivity of the on-board device 1. The test signal S2 outputted by the test component 13 is designed for spreading in the whole reception bandwidth of the receiver 12. Preferentially, the test signal S2 is a DSSS signal added to the reception signal S1. In particular, the DSSS signal is created by the test component 13 from a test message 132 modulated by a pseudorandom sequence of bits known by and stored within a memory of the processing unit 14. Preferentially, the test message 132 is also stored in a memory of the processing unit 14. Said pseudorandom sequence consists in particular in a radio pulse (also called "chip") whose duration is shorter compared to the duration of the test message. The chip sequence 131 is multiplied by the test message 132 in order to create the test signal S2. Preferentially and if necessary, the test signal S2 is then centered inside the receiver bandwidth, for instance by modulating a carrier frequency. For this purpose of "translating" or shifting the test signal frequency into the bandwidth of the receiver antenna so that it becomes centered within the receiver bandwidth frequency, a Differential Phase Shift Keying (DPSK) might be used for modulating the test signal S2. Said test signal S2 is then added to the reception signal S1. According to a first preferred embodiment, the test component 13 comprises a test antenna 133 for emitting a test electromagnetic signal for incorporating or adding the test signal S2 to the reception signal S1, wherein the test electromagnetic signal is configured for being received or picked up by the receiver antenna. According to another preferred embodiment, the test signal S2 is outputted by the test component 13 and directly added to, or incorporated into, the reception signal S1, so that the latter comprises the test signal S2 before being processed by the processing unit 14.

Preferentially, the processing unit 14 further comprises a test signal demodulator 142 capable of demodulating the reception signal S1 in order to ensure that the on-board device 1 is working properly. For instance, the test signal demodulator 142 is configured for comparing the test message 132 stored in the memory of the processing unit 14 with the test message 132 extracted from the reception signal S1, wherein a divergence between the stored test message and the extracted test message might be interpreted as a failure of the onboard device 1.

Preferentially, the test component comprises a modulator, such as a DPSK modulator, for modulating the test signal S2 and providing the latter to the test antenna 133. Apart from the DPSK technique, other techniques for modulating the test signal S2 might be used in order to create a test signal S2 whose frequencies spread within the whole reception bandwidth of the receiver.

Figure 2:
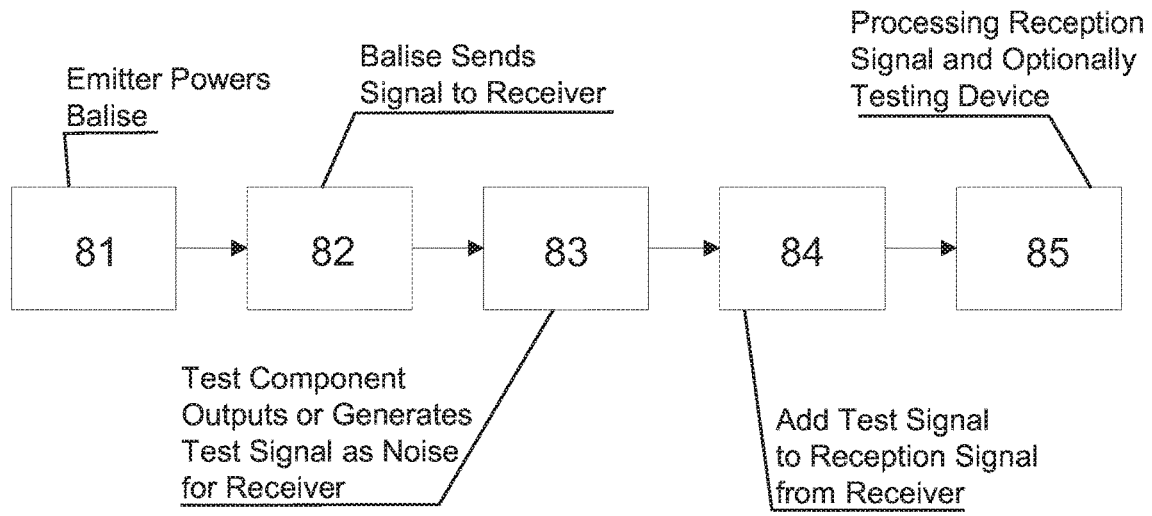
FIG. 2 schematic representation of a preferred embodiment of the method according to the invention.

FIG. 2 illustrates a schematic view of the steps of the claimed method, comprising

- optionally, remotely powering 81 the balise 4 by means of an emitter 11 of the on-board device 1;
- optionally, sending 82, by the balise 4, for instance in response to its powering by the emitter 11, an electromagnetic signal to the receiver 12 of the on-board device 1, wherein said electromagnetic signal is preferentially a FSK signal encoding information transmitted by the balise 4;
- outputting or generating 83 a test signal S2 by a test component 13, wherein said test signal S2 acts as a noise for limiting a sensitivity of the receiver 12, wherein said test signal S2 is configured for spreading over the whole reception bandwidth of the receiver 12, and wherein said test signal S2 preferentially encodes a test message 132;
- adding 84 said test signal S2 to (or incorporating said test signal S2 into) a reception signal S1 outputted by an antenna of the receiver 12 of the on-board device 1, wherein said adding takes place before the processing of the reception signal S1 by a processing unit 14. Preferentially, the test signal S2 is added directly at the output of the receiver antenna or into the antenna. Indeed, according to a preferred embodiment, the test signal S2 is added to the reception signal S1 by means of inductive coupling with the receiver antenna. For instance, the test component 13 comprises a test antenna 133 for sending a test electromagnetic signal to the receiver 12 in order to incorporate said test signal S2 to the reception signal S1 outputted by the receiver antenna through inductive coupling. In that case, the test signal S2 is induced directly into the antenna of the receiver by the test electromagnetic signal emitted by the test antenna 133 and outputted by the test component 13. The test electromagnetic signal is in particular configured for being picked up by the receiver antenna. Indeed, the antenna of the receiver 12 is configured for picking up an electromagnetic radiation which comprises the test electromagnetic signal embedding the test signal S2 and optionally the electromagnetic signal emitted by the balise and embedding said telegram, said picking up of electromagnetic radiation resulting in an output of the reception signal S1 induced by the electromagnetic radiation received by the antenna. In that case, the test electromagnetic signal acts as a noise for limiting the sensitivity of the receiver 12, spreads over the whole reception bandwidth of the receiver 12, and preferentially encodes the test message 132. According to another embodiment, the test signal S2 is a current signal directly added, for instance added in series, to the reception signal S1 outputted by the antenna of the receiver 12, so that the reception signal S1 comprises the test signal S2 before its processing by the processing unit 14;

processing 85 by means of the processing unit 14 the reception signal S1 in order to determine information comprised within the electromagnetic radiation picked up by the receiver antenna, said electromagnetic radiation comprising for instance information sent by the balise 4 and;

optionally, testing if the on-board device 1 is working properly from an extraction of the test message from the reception signal S1.

In particular, in order to test the correct working of the on-board device 1, a variation of amplitude of the test signal S2 is preferentially automatically detected by the processing unit 14 by measuring a correlation between peaks of the chip sequence and peaks of amplitude of the test signal S2 as extracted by the demodulator 142, i.e. as obtained from the demodulation of the reception signal S1 (the extracted test signal will be called hereafter "extracted test signal"). Typically, the chip sequence is used by the processing unit 14 for testing the extracted test signal S2. In particular, the processing unit 14 uses the chip sequence for generating an autocorrelation function with the extracted test signal S2, wherein said autocorrelation function typically exhibits sharp peaks. In that case, the autocorrelation function provides a correlation signal wherein a low value correlation signal is obtained when the chip sequence is time shifted in regards to the received test signal, and a high value correlation signal is obtained when the chip sequence and the received test signal are correlated. In particular, the high value of the correlation signal is proportional to the number of chips and amplitude of the chips. The processing unit 14 is preferentially configured for detecting a change of the amplitude of the test signal S2 from changes in values of the correlation signal obtained from said autocorrelation function, wherein a change of the amplitude of the test signal S2 outputted by the test component 13 is automatically detected as a change of the correlation signal value measured by the processing unit 14. Preferentially, the processing unit 14 is configured for automatically signaling a failure of the on-board device 1 if the value of the correlation signal is below a predefined threshold, which might be stored in a memory of the processing unit 14. Typically, a change of the amplitude of the test signal S2 is detected from a change of the amplitude of the correlation signal (i.e. for instance a change of the amplitude value of correlation peaks of the correlation signal). The correlation signal might be in particular continuously measured over time by the processing unit 14 in order to continuously check the correct working of the on-board device 1.

Figure 3:
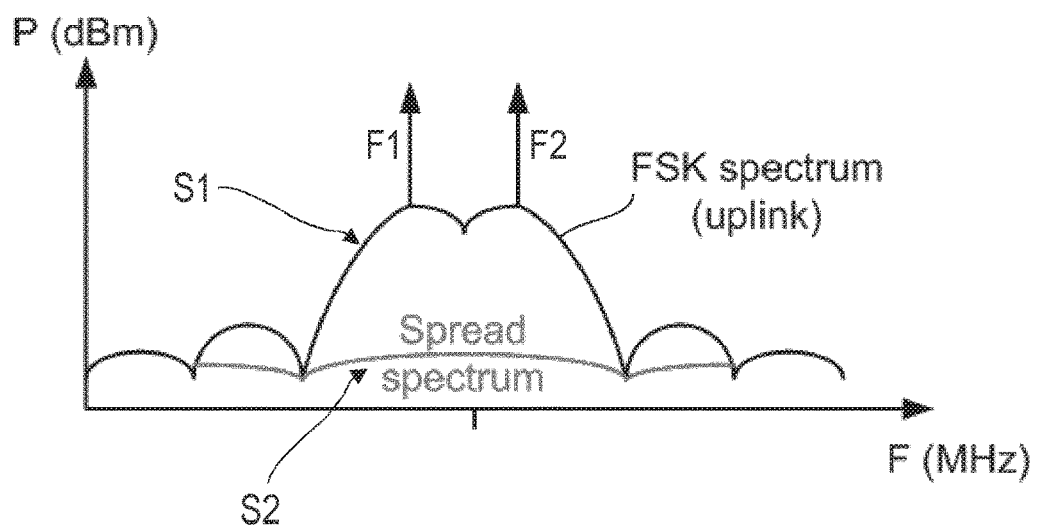
FIG. 3 schematic representations of the DSSS signal and reception signal processed by the processing unit according to the invention.

Finally, FIG. 3 shows a schematic representation of the FSK spectrum of the reception signal S1 outputted by the antenna of the receiver 12 after reception of the electromagnetic signal emitted by the balise and the spread spectrum of the test signal S2 which is added to said reception signal in order to ensure that cross-talk signal cannot be demodulated from the reception signal S1 when the latter comprises the test signal S2.

To conclude, the present invention presents the following advantages compared to existing techniques:

the test signal added to the reception signal can be automatically adjusted by the test component for ensuring an upper limit of the sensitivity of the receiver, by defining for instance a value for a signal to noise ratio that is very difficult to realize using known techniques, such a value being typically 2.4 dB. Indeed, FSK demodulation is not possible under a given signal to noise ratio, and therefore injecting in the reception signal a noise, specifically a white noise, of a given and known energy by means of the test signal enables to guarantee a maximal sensitivity of the receiver;

the test signal acts as a noise added to the reception signal to limit the signal to noise ratio.

the test message might be used to test a correct working of the on-board device;

the proposed solution is an intrinsic limitation of the receiver sensitivity which does not require to double any part of the receiver;

offline tests of the on-board device, which might be performed at each initialization of the on-board device before the guided vehicle is moving on a track equipped with balises and for determining the threshold level of its receiver, can be strongly reduced or even suppressed, since a level of correlation peak gives directly an image of the receiver gain.

The invention claimed is:

1. An on-board device configured to be installed in a guided vehicle for reading a telegram of a balise installed at a point along a route followed by the guided vehicle, the on-board device comprising:

a receiver including an antenna capable of picking up the telegram transmitted by the balise and configured for outputting a reception signal;

a processing unit configured for receiving and processing the reception signal in order to read the telegram output by the balise; and a test component configured for adding a test signal to the reception signal before the processing of the reception signal by the processing unit, the test signal configured to act as a noise for limiting a sensitivity of said receiver.

2. The on-board device according to claim 1, wherein the test signal is added into said antenna of said receiver.

3. The on-board device according to claim 1, wherein a Direct Sequence Spread Spectrum technique is used for creating the test signal.

4. The on-board device according to claim 1, wherein said processing unit includes at least one of a test signal demodulator or a correlator configured for verifying that the reception signal includes the test signal.

5. The on-board device according to claim 4, wherein said demodulator is configured for detecting a change of the sensitivity of said receiver by measuring an amplitude of correlation peaks.

6. The on-board device according to claim 1, wherein the test signal is realized by modulating a pseudorandom sequence of bits known by the onboard device by a test message.

7. The on-board device according to claim 6, which further comprises a test signal demodulator determining a correct working of the on-board device through demodulation of the reception signal.

8. A guided vehicle, comprising the on-board device according to claim 1.

9. A method for cross-talk protection of an on-board device installed in a guided vehicle and configured for reading a telegram of a balise installed at a point along a route followed by the guided vehicle, the method comprising the following steps:

using an antenna of a receiver of the on-board device for receiving electromagnetic radiation;

using the receiver to output a reception signal in response to receiving the electromagnetic radiation;

using a processing unit to receive and process the reception signal for determining information included within the electromagnetic radiation; and adding a test signal to the reception signal before the processing of the test signal by the processing unit, and using the test signal to act as a noise for limiting a sensitivity of the receiver.

10. The method according to claim 9, which further comprises using a test antenna of a test component of the on-board device to emit an electromagnetic test signal of the electromagnetic radiation for inducing the test signal in the antenna of the receiver.

11. The method according to claim 9, which further comprises using a Direct Sequence Spread Spectrum for creating the test signal.

12. The method according to claim 9, which further comprises obtaining the test signal by modulating a test message using a pseudorandom sequence of bits known by the on-board device.

13. The method according to claim 9, which further comprises determining a correct working of the on-board device by demodulation of the reception signal using a test signal demodulator.

* * * * *